(12) United States Patent
Jang et al.

(10) Patent No.: US 9,503,872 B2
(45) Date of Patent: Nov. 22, 2016

(54) METHOD AND APPARATUS FOR SENDING EMERGENCY CALL IN MOBILE TERMINAL

(71) Applicant: Samsung Electronics Co., Ltd., Gyeonggi-do (KR)

(72) Inventors: Yong-Sung Jang, Gyeonggi-do (KR); Sung-Whan Moon, Seoul (KR); Han-Seong Jung, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 13/774,517

(22) Filed: Feb. 22, 2013

(65) Prior Publication Data

US 2013/0225118 A1    Aug. 29, 2013

(30) Foreign Application Priority Data

Feb. 24, 2012 (KR) .................. 10-2012-0019242

(51) Int. Cl.
*H04M 11/04* (2006.01)
*H04W 4/22* (2009.01)
*H04M 1/725* (2006.01)
*H04M 3/38* (2006.01)

(52) U.S. Cl.
CPC ........... *H04W 4/22* (2013.01); *H04M 1/72536* (2013.01); *H04M 3/382* (2013.01); *H04M 2201/38* (2013.01); *H04M 2242/04* (2013.01)

(58) Field of Classification Search
CPC .... H04W 4/22; H04W 76/007; H04W 92/08
See application file for complete search history.

(56) References Cited

U.S. PATENT DOCUMENTS

| | | | |
|---|---|---|---|
| 5,937,355 A * | 8/1999 | Joong et al. .................. 455/466 |
| 6,243,459 B1 * | 6/2001 | Cannon et al. .......... 379/356.01 |
| 6,295,355 B1 * | 9/2001 | O'Neal et al. ............ 379/355.05 |
| 7,738,912 B1 * | 6/2010 | Hawkins et al. ........... 455/550.1 |
| 2002/0068599 A1 * | 6/2002 | Rodriguez et al. ........... 455/550 |
| 2007/0135043 A1 * | 6/2007 | Hayes et al. ................. 455/26.1 |
| 2007/0197193 A1 | 8/2007 | Zhou |
| 2008/0188267 A1 * | 8/2008 | Sagong ................ G06F 1/1626 455/566 |
| 2009/0149153 A1 * | 6/2009 | Lee ........................... 455/404.1 |
| 2009/0205041 A1 * | 8/2009 | Michalske ...................... 726/17 |
| 2010/0190468 A1 | 7/2010 | Scott et al. |
| 2011/0076981 A1 * | 3/2011 | Singh et al. ............... 455/404.1 |
| 2011/0143703 A1 | 6/2011 | Seo et al. |
| 2011/0185313 A1 * | 7/2011 | Harpaz ................. G06F 3/0482 715/826 |

FOREIGN PATENT DOCUMENTS

CN        101442587 A       5/2009

* cited by examiner

*Primary Examiner* — San Htun
(74) *Attorney, Agent, or Firm* — Cha & Reiter, LLC

(57) ABSTRACT

A method for sending an emergency call in a mobile terminal includes receiving a request for transmitting an emergency call in a screen-locked state; and displaying a keypad and/or an emergency button icon in response to the request.

18 Claims, 6 Drawing Sheets

METHOD AND APPARATUS FOR SENDING EMERGENCY CALL IN MOBILE TERMINAL

CLAIM OF PRIORITY

This application claims the benefit under 35 U.S.C. §119(a) of a Korean Patent Application filed in the Korean Intellectual Property Office on Feb. 24, 2012 and assigned Serial No. 10-2012-0019242, the entire disclosure of which is incorporated herein by reference.

BACKGROUND OF THE INVENTION

1. Field of the Invention

The present invention relates generally to mobile terminals, and more particularly, to transmitting emergency calls in mobile terminals.

2. Description of the Related Art

In line with the improvement in technology, mobile terminals such as smart phones implemented with a touch screen now offer a more variety of features such as multimedia players, E-book readers, document editors, and game consoles.

Many different screen lock features have been applied to mobile terminals to prevent the touch screen from being activated during the standby state of the mobile terminals. The screen lock features such as slide unlock and pattern unlock may prevent the touch screen from being unintentionally unlocked due to the accidental slide or pattern input.

These screen lock features may advantageously prevent unintended activations, but may also serve as an obstacle in quickly manipulating the mobile terminals for use because it takes some time or retry to unlock. This is undesirable when a user in an accident needs to quickly place an emergency call.

In order to relieve the discomfort of the conventional screen lock features, some new features have been offered, by which users may make emergency calls without unlocking the touch screen even in a screen-locked state, and these features may be implemented using a separate button dedicated for executing the emergency calls.

The currently available features for transmitting emergency calls may advantageously allow users to quickly place emergency calls without unlocking the touch screen. However, these features are only limited to specific numbers, such as 911 for rescue authorities managed by the government or the government agencies.

Sometimes, in addition to 911 for rescue authorities, the users may need to make emergency calls to other individuals such as their parents or doctors in case of emergency.

Therefore, there is a need for a new method and apparatus for transmitting emergency calls to user-set separate contacts (e.g., parents or doctor) in addition to the general emergency contacts such 911 when the terminal is in the screen-locked state.

SUMMARY OF THE INVENTION

An aspect of an exemplary embodiment of the present invention is to provide a method and apparatus for transmitting emergency calls to user-set separate contacts during a screen-locked state.

Another aspect of an exemplary embodiment of the present invention is to provide a method and apparatus for allowing a user to place emergency calls more conveniently and quickly during a screen-locked state.

In accordance with one aspect of the present invention, a method for sending an emergency call in a mobile terminal includes receiving a request for sending an emergency call in a screen-locked state; and displaying at least one of a keypad and a button corresponding to display of emergency contacts, in response to the request for sending an emergency call.

In accordance with another aspect of the present invention, a method for sending an emergency call in a mobile terminal includes receiving a request for sending an emergency call in a screen-locked state; and determining the number of contacts registered in a list of emergency contacts in response to the request for sending an emergency call, and sending a call to a specific contact depending on the determined number.

In accordance with further another aspect of the present invention, an apparatus for sending an emergency call in a mobile terminal includes a memory for storing emergency contacts; a display having a touch screen; a wireless transceiver for providing a call sending feature; and a controller for displaying on the display at least one of a keypad and a button corresponding to display of emergency contacts, upon receiving a request for sending an emergency call in a screen-locked state of the touch screen.

In accordance with yet another aspect of the present invention, an apparatus for sending an emergency call in a mobile terminal includes a memory for storing emergency contacts; a display having a touch screen; a wireless transceiver for providing a call sending feature; and a controller for determining the number of contacts registered in a list of emergency contacts and sending a call to a specific contact depending on the determined number, upon receiving a request for sending an emergency call in a screen-locked state of the touch screen.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
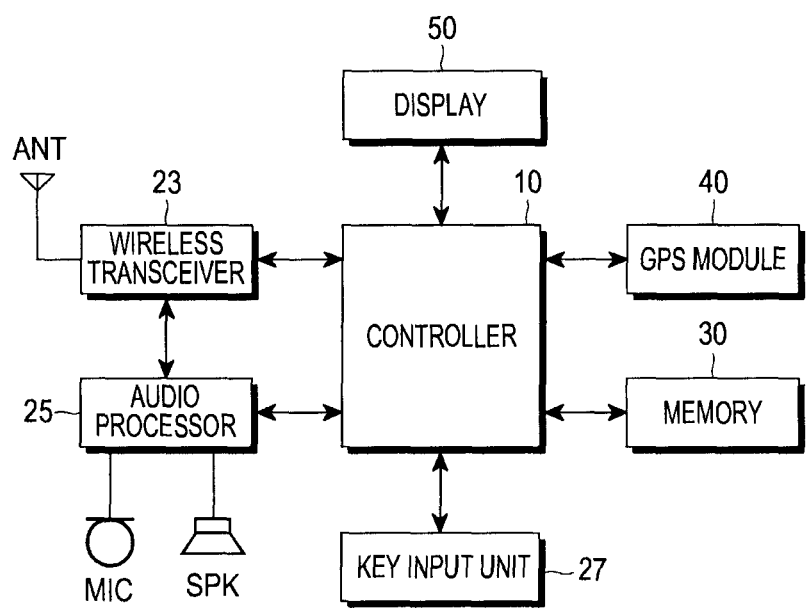
FIG. 1 is a block diagram of a mobile terminal according to an embodiment of the present invention.

FIG. 1 is a block diagram of a mobile terminal according to an embodiment of the present invention. It should be noted that mobile terminals, to which exemplary embodiments of the present invention are applicable, may be portable electronic devices or any duplex systems such as the conventional mobile phones, and the latest tablet Personal Computers (PCs) and smart phones that are driven by Windows 8®, iOS®, Android®, etc.

As shown, a wireless transceiver 23 includes a Radio Frequency (RF) unit and a modulator/demodulator (modem). The RF unit includes an RF transmitter for up-converting a frequency of transmission signals and amplifying the up-converted transmission signals, and an RF receiver for low-noise-amplifying received signals and down-converting a frequency of the amplified received signals. The modem includes a transmitter for coding and modulating transmission signals, and a receiver for demodulating and decoding received signals output from the RF unit.

By means of the wireless transceiver 23, a user may make good use of not only the call sending/receiving features, but also the emergency call sending/receiving features.

An audio processor 25 may constitute a coder/decoder (codec), which includes a data codec and an audio codec. The data codec processes packet data and the like, and the audio codec processes audio signals such as voice and multimedia files. The audio processor 25 may convert digital audio signals received from the modem into analog audio signals by means of the audio codec, and play the analog audio signals using a speaker SPK. The audio processor 25 may convert analog audio signals picked up by a microphone MIC into digital audio signals by means of the audio codec, and transfer the digital audio signals to the modem. The codec may be provided as a separate device, or may be included in a controller 10.

A key input unit 27 may include numeric/character keys needed to input numeric/character information, and function keys or a touch pad needed to set various functions. When a display 50 is implemented to have a capacitive or resistive touch screen, the key input unit 27 may include a minimum number of preset keys, and the display 50 may replace part of the key input function of the key input unit 27.

A memory 30 may include a program memory and a data memory. The program memory may store programs for controlling the general operation of the mobile terminal. The memory 30 may further include an external memory such as a Compact Flash (CF) card, a Secure Digital (SD) card, a Micro Secure Digital (Micro-SD) card, a Mini Secure Digital (Mini-SD) card, a card Extreme Digital (xD) card, and a memory stick. The memory 30 may also include a disk such as a Hard Disk Drive (HDD) and a Solid State Disk (SSD).

In accordance with an embodiment of the present invention, the memory 30 may store registration information (e.g., contact information such as names, phone numbers, e-mail addresses, etc.) of contacts included in a list of emergency contacts, and the emergency contacts may include general emergency contacts such as police and hospital, and personal emergency contacts such as doctors and religious leaders.

The general emergency contacts correspond to the public emergency contacts managed by the government or the government agencies, and may be provided by default by the manufacturer of the mobile terminal, the provider of the operating system, or the communication service provider. For example, the general emergency contacts may include, for example, 118 (for cyber terrorism report center), 112 (for crime report), 128 (for pollution report), 131 (for weather forecast), 132 (for legal counseling), 125 (for smuggling report), 182 (for missing/runaway report), 127 (for drug report), 1333 (for traffic information), 1336 (for personal information violation report), 1339 (for hospital information), 1366 (for women protection), 1391 (for child abuse report), etc.

The personal emergency contacts may refer to private contacts (e.g., father, mother, doctor, etc.) which the user has set in advance so as to be displayed when he/she wants to make emergency calls in a screen-locked state. Contacts registered in a list of personal emergency contacts may be added as the user directly inputs registration information such as names and phone numbers. The contacts may also be added as the user sets or selects desired contacts, which are read from the existing phone book data and displayed in the list of personal emergency contacts.

A Global Positioning System (GPS) module 40 receives GPS information including information such as ephemeris and almanac, along with calibration coefficients, and provides location information for the current location of the mobile terminal based on the longitude values and location values corresponding to the current location of the mobile terminal. Generally, for the mobile terminal, a combined Assismous GPS (A-GPS) system of an Assisted GPS system and an Autonomous GPS system is mainly used because of its short Time to First Fix (TTFF), which is the time in which the mobile terminal may receive GPS signals and calculate its current location. However, other systems known in the art may be used.

In accordance with an embodiment of the present invention, the GPS module 40 may be used to transmit emergency information, when a call (i.e., emergency call) sent upon emergency call request is failed. In other words, when sending of an emergency call is failed, the controller 10 may provide information about a location of the mobile terminal at a time where the sending of the emergency call is failed (or at the sending time of the failed emergency call), to the counterpart mobile terminal of the failed emergency call, using the GPS module 40.

The display 50, which may include Liquid Crystal Display (LCD) or Organic Light Emitting Diodes (OLED) which may be classified into Passive Mode OLED (PMOLED) and Active Mode OLED (AMOLED), outputs various display information generated in the mobile terminal. The display 50, which is implemented to have a capacitive or resistive touch screen, may serve as an input unit for controlling the mobile terminal, together with the key input unit 27.

In an embodiment of the present invention, the display 50 supports touch screen features provided for sending emergency calls in a screen-locked state, and screen lock features can be selectively set and released by the user.

The controller 10 controls the overall operation of the mobile terminal according to an embodiment of the present invention. The controller 10 may switch or control operations of the mobile terminal depending on user inputs received from the key input unit 27 and/or the display 50. In accordance with an embodiment of the present invention, the controller 10 displays at least one of a keypad and a button corresponding to display of emergency contacts upon request for sending an emergency call in a screen-locked state.

Although the devices to be included in the mobile terminal, such as a Bluetooth module, a camera module, a Wireless Fidelity (Wi-Fi) module, an acceleration sensor, a proximity sensor, a geomagnetic sensor and a Digital Media Broadcasting (DMB) receiver, are not shown in the block diagram of FIG. 1, it will be apparent to those of ordinary skill in the art that these undepicted devices may also be included in the mobile terminal provided by an embodiment of the present invention to provide their own unique functions.

For example, the Wi-Fi module supporting Voice over Internet Protocol (VoIP) features may provide call (or emergency call) sending/receiving features on behalf of the wireless transceiver 23. The Wi-Fi module may also be used to determine location information of the mobile terminal on behalf of the GPS module.

Figure 2:
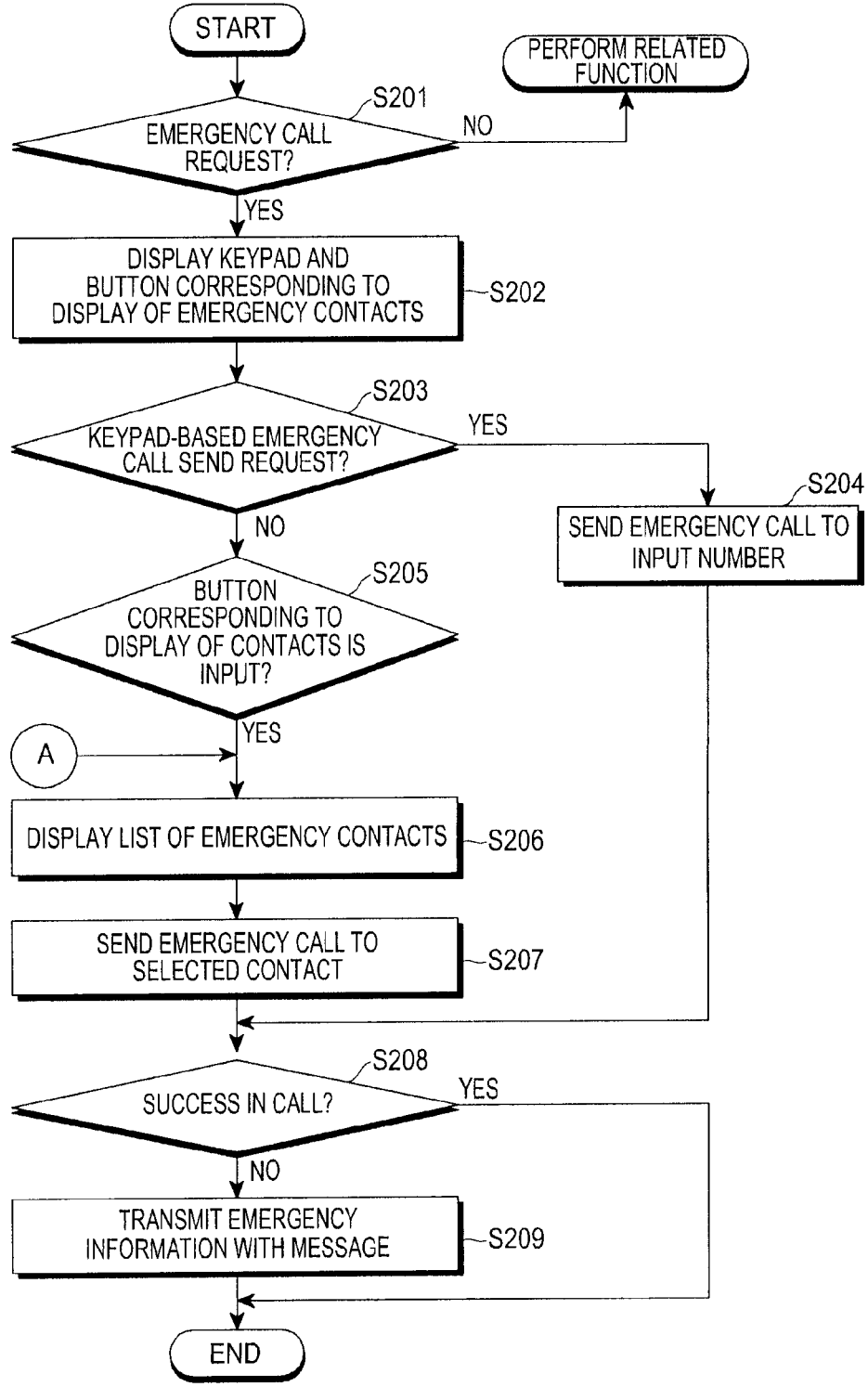
FIG. 2 shows a process of sending an emergency call according to an embodiment of the present invention.

FIG. 2 shows a process of sending an emergency call according to an embodiment of the present invention. FIGS. 3A to 3C, 4A to 4D, and 5A to 5C show first, second and third examples of a process of sending an emergency call according to an embodiment of the present invention, respectively.

As shown, in steps S201 and S202, upon detecting a request for sending an emergency call, the controller 10 displays a keypad and/or a button corresponding to display of emergency contacts.

Figure 3A:
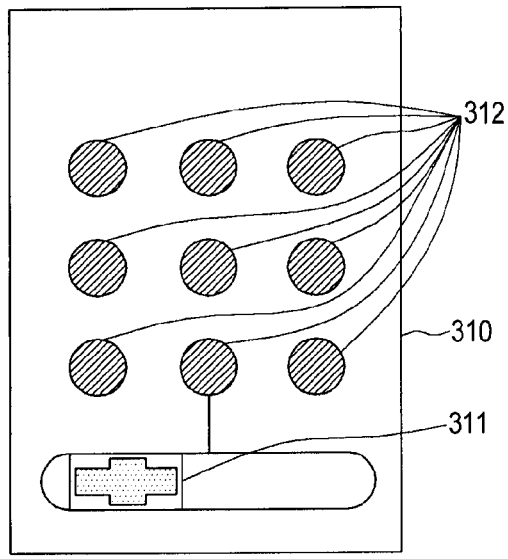
FIGS. 3A to 3C show a first example of a process of sending an emergency call according to an embodiment of the present invention.

Referring to FIG. 3A, a screen 310 shown in FIG. 3A corresponds to a touch screen, to which screen lock is applied by pattern lock features. The user may release or unlock the screen lock by inputting a preset pattern with pattern input pints 312 shown in FIG. 3A, or may request sending of an emergency call by sliding an emergency call button 311 from left to right shown in FIG. 3A.

Figure 3B:
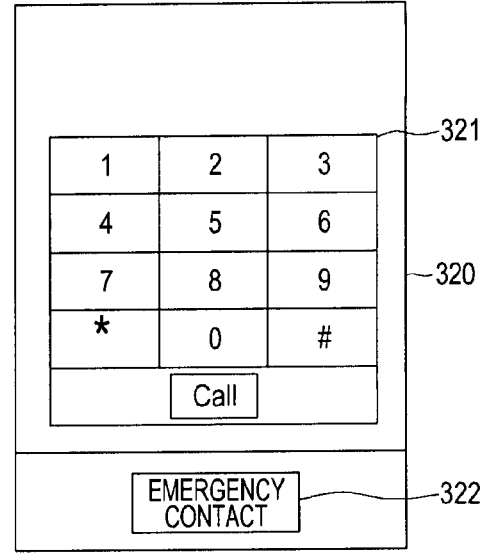

If it is determined that the user in emergencies requests sending of an emergency call by manipulating the emergency call button 311 when the mobile terminal is in a screen-locked state, the controller 10 displays a keypad 321 and a button 322 corresponding to an emergency contact icon on the screen 320 as shown in FIG. 3B. Alternatively, the request for sending the emergency call can be achieved by activating a side button or other button designated for such purpose.

Here, the user may request a call transmission by inputting a specific number (e.g., 119) on the virtual keypad 321 shown in FIG. 3B, or may request a display a list of emergency contacts by inputting or touching the button 322.

In an embodiment of the present invention, if it is determined that a transmission of an emergency call is requested by the user, the mobile terminal may display not only at least one of a keypad and a button corresponding to a display of emergency contacts, but also a predetermined number of counterpart contacts to which emergency calls have been sent most frequently, or of counterpart contacts for the last sent emergency calls, based on the emergency call history.

Figure 3C:
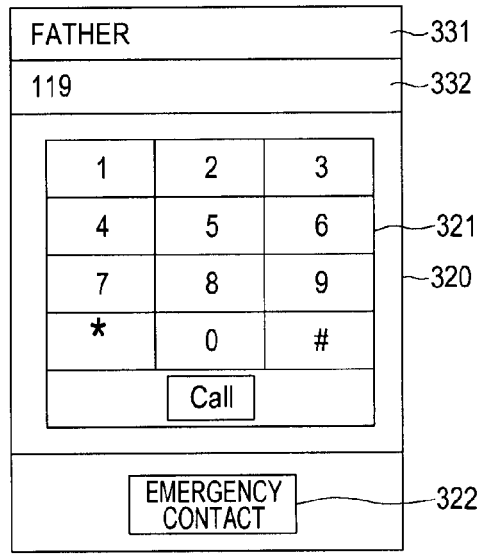

For example, when an emergency call is requested by the user by activating the emergency call button 311 shown in FIG. 3A, the controller 10 displays a predetermined number of (e.g., two) contacts 331 and 332 based the emergency call history, in addition to the preset keypad 321 and the button 322, as shown in FIG. 3C. The contacts 331 and 332 shown in FIG. 3C may be the first two contacts to which emergency calls have been sent most frequently, or the first two contacts for the last sent emergency calls, in the emergency call history. Although the predetermined number is assumed to be two in FIG. 3C, it may be re-set by the user.

Accordingly, as described above with reference to FIG. 3C, the user may immediately request sending of an emergency call by selecting a contact 331 or 332 without the need to manually press keys on the keypad 321, or without the need to press the button 322 to check emergency contacts.

In addition to the conventional technology of storing a call history, the controller 10 may separately manage an emergency call history and store it in the memory 30.

Referring back to FIG. 2, in steps S203 and S204, upon a request for sending a keypad-based emergency call, the controller 10 sends an emergency call to a number input by the user. Here, if the user requests sending of an emergency call, a display screen may be displayed on the display 50 as shown in FIG. 3B or 3C. Therefore, the user may input his/her desired number on the virtual keypad 321 shown in FIG. 3B or 3C, and transmit an emergency call to the input number.

The controller 10 sends a call to the number input from the keypad 321 in cooperation with a communication server (not shown) in response to the request for sending an emergency call using the wireless transceiver 23 or the Wi-Fi module (not shown).

In steps S205 to S207, if a button corresponding to display of emergency contacts is input or touched, the controller 10 displays a list of emergency contacts and transmits a call to the contact that the user has selected.

Figure 4A:
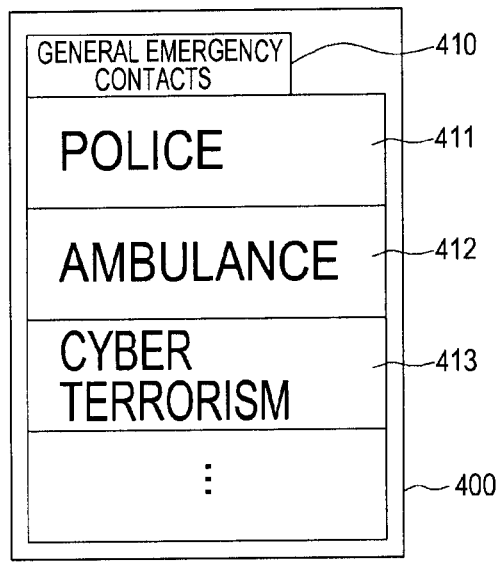
FIGS. 4A to 4D show a second example of a process of sending an emergency call according to an embodiment of the present invention.
Figure 4B:
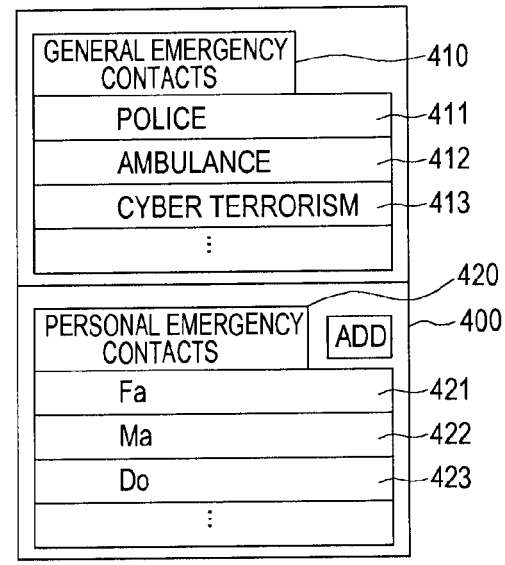

If the button 322 shown in FIG. 3B or 3C is input (e.g., touched), the controller 10 displays a list of emergency contacts in response thereto, as shown in FIG. 4A or 4B.

In an embodiment of the present invention, emergency contacts may include general emergency contacts and personal emergency contacts. If display of emergency contacts is requested from the user (e.g., if a button corresponding to display of emergency contacts is input), only the general emergency contacts may be displayed, or alternatively, the general emergency contacts and the personal emergency contacts may be displayed together. In other words, upon receiving a request for displaying emergency contacts from the user, the controller 10 may display only the general emergency contacts as shown in FIG. 4A, or may display the general emergency contacts and the personal emergency contacts together as shown in FIG. 4B.

FIG. 4A shows an example in which only general emergency contacts 410 among emergency contacts are displayed in response to the user's request for displaying emergency contacts. Reference numerals 411 to 413 represent general emergency contacts: 112 for contacting the police station, 119 for calling an ambulance, and 118 for reporting cyber terrorism, respectively.

The term 'personal emergency contacts' as used herein may refer to the emergency contacts that the user sets by directly inputting names and numbers. FIG. 4B shows an example in which both the general emergency contacts 410 and personal emergency contacts 420 are displayed in response to the user's request for displaying emergency contacts.

As to the personal emergency contacts 420 shown in FIG. 4B, it can be understood that the user has registered contacts 'Fa' 421, 'Ma' 422 and 'Do' 423 in a list of personal emergency contacts.

The contacts displayed in the names of 'Fa' 421, 'Ma' 422 and 'Do' 423 shown in FIG. 4B may correspond to contacts having the names of 'father', 'mother' and 'doctor', respectively.

An embodiment of the present invention provides a feature of displaying the name of a specific contact if the user selects or touches the specific contact being displayed as its alias. This may be understood from FIG. 4C.

Figure 4C:
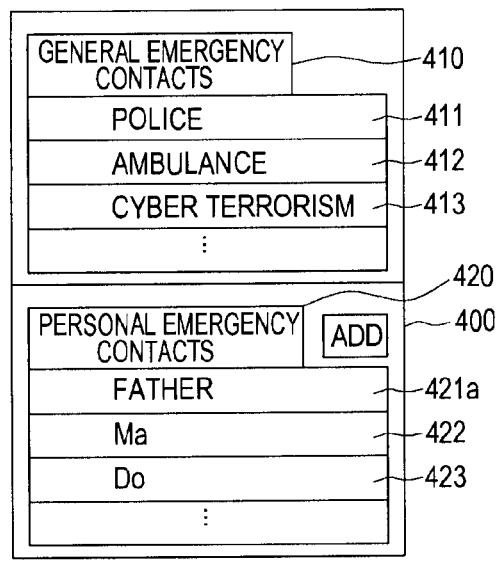

In other words, if the contact 421 being displayed as an alias of 'Fa' is selected while the emergency contacts are displayed as shown in FIG. 4B, the controller 10 may display the registered actual name 'Father' 421a of the contact 421 as shown in FIG. 4C. The reason for displaying in FIG. 4B the contacts 421 to 423 belonging to the personal emergency contacts as their aliases which are different from their registered names, is to protect the privacy of the user. That is, when displaying the personal emergency contacts, the mobile terminal may not normally display names of the contacts belonging to the personal emergency contacts in order to protect the privacy of the user.

Figure 4D:
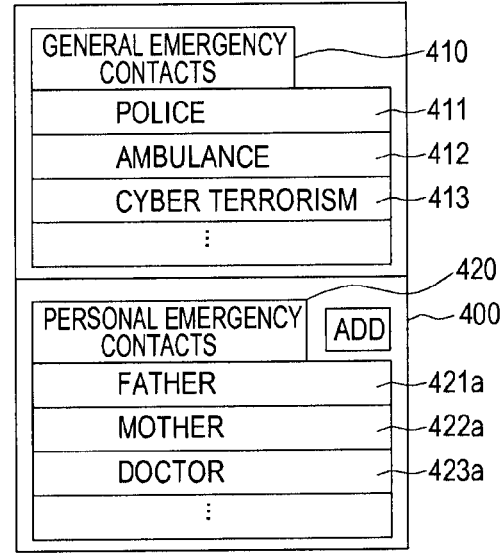

Alternatively, unlike the foregoing description made so far with reference to FIGS. 4B and 4C, an embodiment of the present invention may provide a feature of immediately displaying the registered names (e.g., father, mother and doctor) 421a, 422a and 423a of the contacts belonging to the personal emergency contacts as shown in FIG. 4D, upon a user's request for displaying emergency contacts.

If emergency contacts are displayed as in any one of FIGS. 4B to 4D, the user may select an arbitrary contact to request sending of a call (i.e., an emergency call) thereto. For example, if the user requests sending of a call to a contact corresponding to 'father' by touching the contact 421a shown in FIG. 4C for a predetermined time or more or by separate menu settings, then the controller 10 may check the number registered in the contact 421a and transmit a call to the number in response to that request.

In steps S208 and S209, the controller 10 determines whether the call transmission is successful, and transmits a preset emergency text message to the counterpart contact if the sent call is failed.

In some cases, the other party or the counterpart contact may not respond to the call for some reasons, even though the user sends an emergency. Thus, if the other party has failed to receive the sent call, the mobile terminal transmits preset emergency information to the intended party.

For example, if the other party (e.g., father) has failed to receive a specific call even though the user sent the specific call to the contact 421a shown in FIG. 4C, the controller 10 may transmit preset emergency information to the contact 421a. Here, the preset emergency information may include at least one of text information and location information. The text information refers to the information that may be set by the user or the mobile terminal's system settings, and the location information refers to the information about a location of the mobile terminal at a time where sending of a call is failed (or a time where sending of a call is started).

Figure 5A:
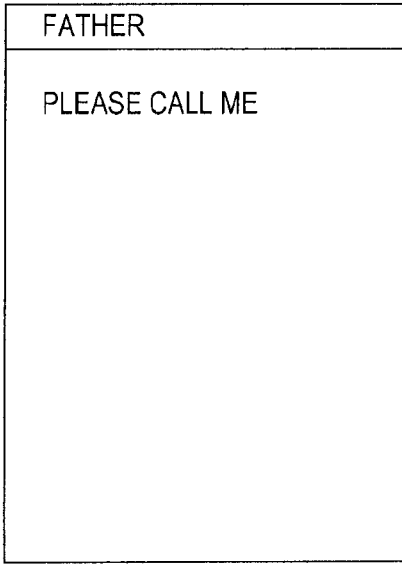
FIGS. 5A to 5C show a third example of a process of sending an emergency call according to an embodiment of the present invention.

FIG. 5A shows an example of a preset emergency text message (e.g., 'please contact') is transmitted to the other party (e.g., father) when a call is failed.

Figure 5B:
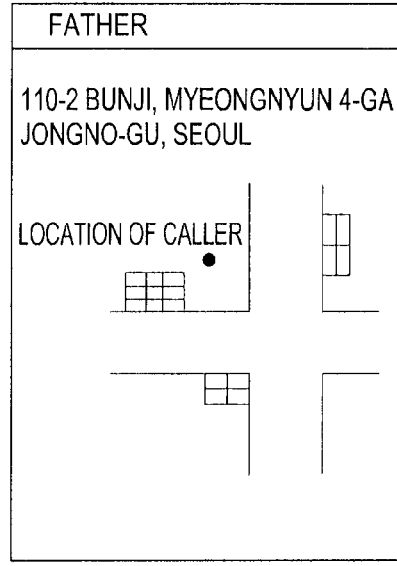

FIG. 5B shows an example of location information (e.g., address information and map information) of the mobile terminal at a time where the call is failed (or a time at which sending of the call is started) is transmitted to the other party (e.g., father).

Figure 5C:
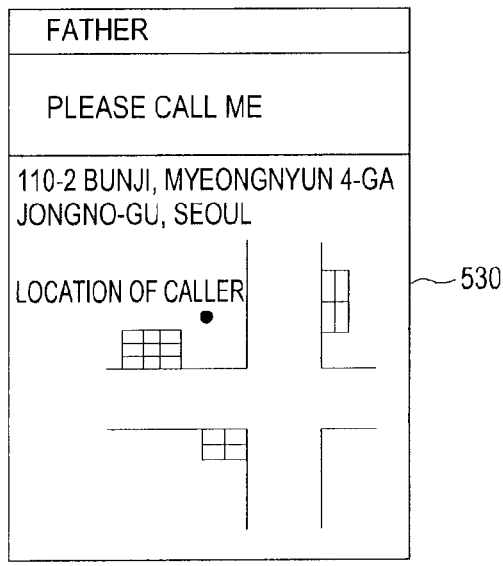

FIG. 5C shows another example of a message where both the text information and the location information are transmitted to the other party (e.g., father).

It is assumed that upon receiving the emergency information including location information, the receiving mobile terminal runs a preset application capable of taking advantage of the received emergency information. For example, the receiving mobile terminal may run an application such as Google Maps® and display, for its user, a location on the map, which corresponds to the location information included in the emergency information.

The transmission of an emergency call may be determined to be completed or successful based on predetermined information acquired from a base station (not shown) supporting communication services, or by counting ring-back tone signals generated during the call sending. For example, during call transmission, the controller 10 may acquire, from a base station (not shown), information indicating that a mobile terminal of the recipient party is turned off, or information indicating that the recipient has entered a service for leaving voice messages. Further, the controller 10 may determine that the call transmission is failed if the number of counted ring-back tone signals generated during call sending is greater than or equal to a predetermined number (e.g., 10).

Although it is assumed herein that preset emergency information is transmitted upon failure of emergency calls, it can be implemented to send such information before or after transmitting the emergency call regardless of whether the emergency call is successful or failed.

Meanwhile, the transmitted preset emergency information (e.g., text information such as messages) may include a flag bit based on which it is possible to determine that the information is emergency information by a recipient mobile terminal. Thus, upon receiving the preset emergency information, the recipient mobile terminal may determine whether the received information is emergency information or general information. For example, upon receiving emergency information (e.g., text information) in the form of a message including a flag bit, which is different from the general message, the recipient mobile terminal may determine whether the received message is a general message or an emergency message (e.g., emergency information including text information). Thereafter, the recipient mobile terminal, which has received emergency information, may determine that a received call is an emergency call and may inform the user of the reception of an emergency call via an alert audio signal, light signal, vibration signal, email, voice or any combination thereof.

Figure 6:
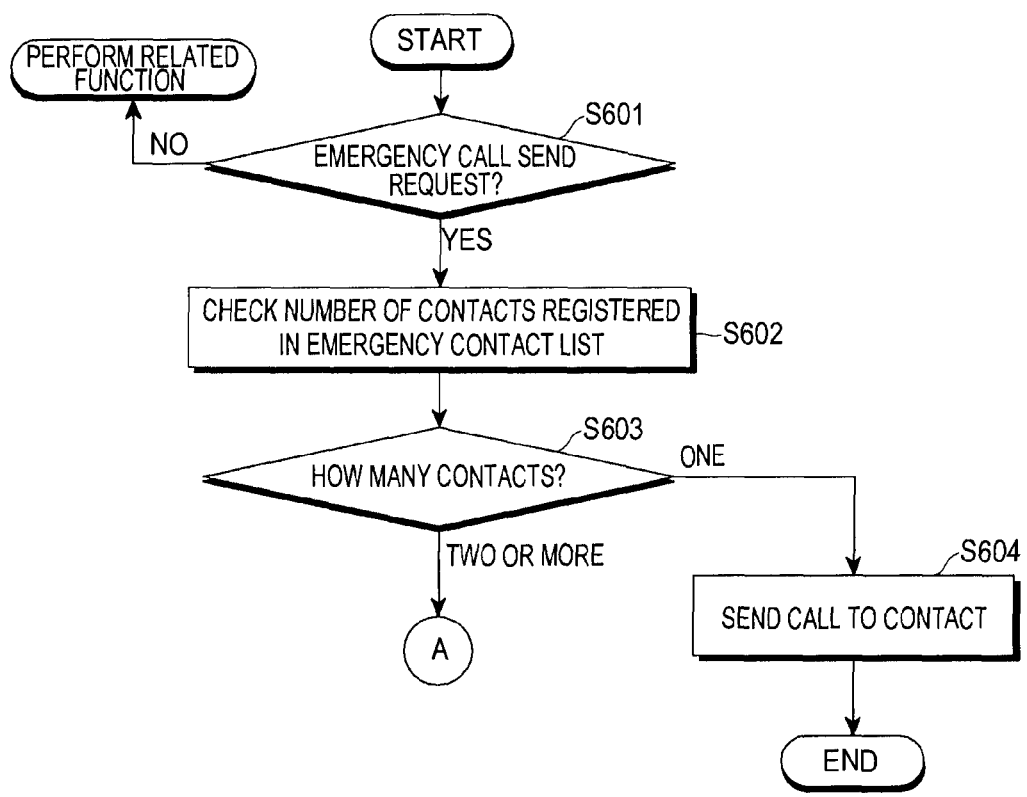
FIG. 6 shows a process of sending an emergency call according to another embodiment of the present invention.

FIG. 6 shows a process of sending an emergency call according to another embodiment of the present invention which will be described below with reference to FIGS. 4A to 6. Note that this embodiment is implemented when the mobile terminal receives a request for sending emergency calls from its user in a screen-locked state.

In steps S601 and S602, upon detecting a user's request for sending an emergency call, the controller 10 determines the number of contacts registered in a list of emergency contacts.

For a mobile terminal that is in a screen-locked state such as pattern-locked state, if its user requests sending of an emergency call by manipulating a button for requesting emergency calls, such as the emergency call button 311 shown in FIG. 3A, the controller 10 may determine the total number of contacts by checking a list of emergency contacts stored in the memory 30. To this end, the controller 10 determines the number of contacts included in a list of general emergency contacts and a list of personal emergency contacts, which are stored in the memory 30.

In steps S603 and S604, if the number of contacts in the list of emergency contacts is one, the controller 10 sends a call to the one contact, and if the number of contacts is two or more, the controller 10 proceeds to step A (or step S206 in FIG. 2).

In accordance with another embodiment of the present invention, if the number of contacts in the list of emergency contacts is one, the controller 10 immediately sends a call to the contact, facilitating quick sending of emergency calls.

However, if the number of contacts in the list of emergency contacts is two or more, the controller 10 proceeds to step A (or step S206). After proceeding to step A, as described in conjunction with FIG. 2, the controller 10 displays the list of contacts, sends a call to a selected contact, determines whether the sent call is failed or not, and if so, transmits preset emergency information to the selected contact if the sent call is failed.

As is apparent from the foregoing description, a mobile terminal may send emergency calls to user-set separate contacts in a screen-locked state, and may also allow a user to make emergency calls more conveniently and quickly in the screen-locked state. It should be noted that teaching of present invention can be applicable to other different scenario. For example, on the assumption that a kidnapper kidnaps a child on his/her way to school and sends a call to the child's parents using the emergency contact icon, the emergency call may be executed by a predetermined monitoring center supporting the communication features. Thus, upon a request for sending an emergency call, a mobile terminal sending the emergency call transmits a Dual Tone Multi Frequency (DTMF) signal for recognizing a caller ID to a monitoring center, and the monitoring center supports a call connection to the phone number corresponding to the DTMF signal. Thereafter, the monitoring center monitors phone conversation of the connected call. If words such as 'kidnap' and 'ransom' are monitored, the monitoring center may request and acquire location information of the mobile terminal that transmitted the call, without the consent of the user (i.e., the kidnapper) of the mobile terminal. Thus, the monitoring center may provide the acquired location information of the mobile terminal to the police to cope with the emergency situation (e.g., kidnapping).

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting an emergency call in a mobile terminal, comprising:
   before receiving input of any portion of an emergency call number, displaying a password input screen and an emergency button for transmitting the emergency call in a screen-locked state;
   in response to receiving an input of the emergency button in the screen-locked state, converting from the password input screen to a phone number input screen for inputting the emergency call number in the screen-locked state in response to the input of the emergency button, the phone number input screen comprising a plurality of number keys and a call request button which is represented by a text or a phone image selectable to dial the input emergency call number, the call request button displayed below the plurality of number keys before transmission of any outgoing call;
   receiving an input of a phone number through the phone number input screen;
   after converting from the password input screen, transmitting the emergency call to the input phone number when the input phone number corresponds to at least one emergency phone number stored in the mobile terminal; and
   determining whether the emergency call transmission is successful, and if not successful, transmitting preset emergency information to a recipient.

2. The method of claim 1, further comprising:
   displaying an emergency contact list icon when the input of the emergency button is received.

3. The method of claim 2, wherein in response to detecting selection of the emergency contact list icon, a list of stored emergency contacts is displayed including at least one general emergency contact for a public service, and at least one personal emergency contact for a private individual.

4. The method of claim 1, wherein the preset emergency information includes preset text information and/or information about a location of the mobile terminal at a time where the call is failed.

5. A method for transmitting an emergency call in a mobile terminal, comprising:
   displaying a password input screen and an emergency button for transmitting the emergency call in a screen-locked state;
   in response to receiving a request for transmitting the emergency call in the screen-locked state, displaying a phone number input screen including an emergency contact button, a predetermined number of emergency contacts, and a keypad in the screen-locked state;
   when a phone number is received through the keypad, transmitting the emergency call based on the phone number;
   when one of the emergency contacts displayed in the phone number input screen is selected, transmitting the emergency call to the selected emergency contact;
   when the emergency contact button is selected and a number of contacts registered in the list of emergency contacts is two or more, displaying a list of emergency contacts and transmitting the emergency call to a selected contact from the list, wherein the list of emergency contacts comprises at least one information related to a personal emergency contact that is set using existing phone book data; and
   determining whether the emergency call transmission is successful, and if not successful, transmitting preset emergency information to a recipient.

6. The method of claim 5, wherein the list of emergency contacts includes a list of general emergency contacts of public services and a list of personal emergency contacts of private individuals.

7. The method of claim 6, wherein at least one contact corresponding to the personal emergency contact is displayed with an alias name that is different from a registered name, and the at least one contact displayed with the alias name is updated to the registered name when the at least one contact is selected for transmitting the emergency call.

8. The method of claim 5, wherein the emergency information includes preset text information and/or information about a location of the mobile terminal at a time when the emergency call fails.

9. The method of claim 5, wherein the emergency call is transmitted based on the phone number, if the phone number is an emergency phone number.

10. An apparatus for transmitting an emergency call in a mobile terminal, comprising:
a display having a touch screen; and
a controller configured to:
before receiving input of any portion of an emergency call number, display a password input screen and an emergency button for transmitting the emergency call in a screen-locked state;
convert from the password input screen to a phone number input screen for inputting an emergency call number in the screen-locked state in response to an input of the emergency button, the phone number input screen comprising a plurality of number keys and a call request button which is represented by a text or a phone image selectable to dial the input emergency call number, the call request button disposed on the display below the plurality of number keys before transmission of any outgoing call;
receive an input of a phone number through the phone number input screen;
after converting from the password input screen, transmit the emergency call to the input phone number when a phone number input through the phone number input screen corresponds to at least one emergency phone number stored in the mobile terminal; and
determine whether the emergency call transmission is successful, and if not successful, transmit preset emergency information to a recipient.

11. The apparatus of claim 10, wherein the controller displays an emergency contact list icon when the input of the emergency button is received.

12. The apparatus of claim 11, wherein in response to detecting selection of the emergency contact list icon, a list of stored emergency contacts is displayed including at least one general emergency contact for a public service, and at least one personal emergency contact for a private individual.

13. The apparatus of claim 10, wherein the emergency information includes preset text information and/or information about a location of the mobile terminal at a time where the call is failed, and the location information is acquired by at least one of a Global Positioning System (GPS) module and a Wireless Fidelity (Wi-Fi) module.

14. An apparatus for transmitting an emergency call in a mobile terminal, comprising:
a display having a touch screen; and
a controller configured to:
in response to receiving an emergency call request in a screen-locked state of the touch screen, display on the display a phone number input screen including an emergency contact button, a predetermined number of emergency contacts, and a keypad in the screen-locked state,
when a phone number is received through the keypad, transmit the emergency call based on the phone number,
when one of the emergency contacts displayed in the phone number input screen is selected, transmitting the emergency call to the selected emergency contact, and
when the emergency contact button is selected and a number of contacts registered in the list of emergency contacts is two or more, display a list of emergency contacts and transmit the emergency call to a selected contact from the list of emergency contacts,
wherein the list of emergency contacts comprises at least one information related to a personal emergency contact that is set using existing phone book data, and
wherein the controller determines whether the emergency call transmission is successful, and if not successful, transmits preset emergency information to a recipient.

15. The apparatus of claim 14, wherein the controller is further configured to:
in response to selection of the emergency contact button, detect the number of registered contacts by counting individual contacts within the list of emergency contacts; and
in response to detecting that the number of registered contacts is one such that there is a sole registered contact, execute the emergency call to the sole registered contact instead of displaying the list of emergency contacts.

16. The apparatus of claim 15, wherein the emergency information includes preset text information, and wherein the emergency information includes information about a location of the mobile terminal at a time when the emergency call fails, and the location information is acquired by at least one of a Global Positioning System (GPS) module and a Wireless Fidelity (Wi-Fi) module.

17. The apparatus of claim 14, wherein the controller further displays at least one contact corresponding to the personal emergency contact with an alias name that is different from a registered name, and the alias name is updated to the registered name when the at least one contact is selected.

18. The apparatus of claim 14, wherein the controller transmits the emergency call based on the phone number, if the phone number is an emergency phone number.

* * * * *